(12) United States Patent
Lackore (10) Patent No.: US 7,878,472 B2
(45) Date of Patent: Feb. 1, 2011

(54) AUTO-LOCKING HOLDER APPARATUS

(75) Inventor: James Roger Lackore, Appleton, WI (US)

(73) Assignee: Pierce Manufacturing Inc., Appleton, WI (US)

(*) Notice: Subject to any disclaimer, the term of this patent is extended or adjusted under 35 U.S.C. 154(b) by 529 days.

(21) Appl. No.: 10/963,359

(22) Filed: Oct. 12, 2004

(65) Prior Publication Data

US 2006/0076820 A1    Apr. 13, 2006

(51) Int. Cl.
*A47K 1/06* (2006.01)
(52) U.S. Cl. .................. 248/313; 248/311.2; 211/75; 224/148
(58) Field of Classification Search ............. 248/154, 248/313, 311.2, 316.1, 316.5, 316.2, 316.3; 211/75; 297/191; 169/51; 224/148
See application file for complete search history.

(56) References Cited

U.S. PATENT DOCUMENTS

| | | | | |
|---|---|---|---|---|
| 1,701,419 A | * | 2/1929 | Peden | 248/488 |
| 3,547,391 A | * | 12/1970 | Johnson | 248/311.3 |
| 3,603,550 A | * | 9/1971 | Byrd | 248/313 |
| 3,633,936 A | * | 1/1972 | Huber | 280/749 |
| 3,780,972 A | * | 12/1973 | Brodersen | 248/313 |
| 3,823,907 A | * | 7/1974 | Ziaylek, Jr. | 248/313 |
| 3,921,950 A | * | 11/1975 | Sentinella | 248/313 |
| 3,968,978 A | * | 7/1976 | Hayashi | 280/803 |
| 4,165,100 A | * | 8/1979 | Takada | 280/802 |
| 4,586,687 A | * | 5/1986 | Ziaylek, Jr. | 248/313 |
| 4,681,347 A | * | 7/1987 | Tamura et al. | 280/804 |
| 4,726,539 A | * | 2/1988 | Schmidt et al. | 242/382.2 |
| 4,817,885 A | * | 4/1989 | Matsumoto | 242/382.2 |
| 4,821,990 A | * | 4/1989 | Porter et al. | 248/316.5 |
| 5,044,459 A | * | 9/1991 | Nishikaji | 180/268 |
| 5,219,206 A | * | 6/1993 | Anthony et al. | 297/473 |
| 5,314,233 A | | 5/1994 | Bostrom et al. | |
| 5,354,029 A | | 10/1994 | Ziaylek, Jr. et al. | |
| 5,560,684 A | | 10/1996 | Gilmore | |
| 5,987,717 A | | 11/1999 | Peterson et al. | |
| 6,601,923 B2 | | 8/2003 | Pond et al. | |
| 6,655,745 B2 | | 12/2003 | Fohrenkamm et al. | |
| 6,702,242 B1 | | 3/2004 | Ziaylek, Jr. et al. | |
| 6,883,766 B1 | * | 4/2005 | Ziaylek et al. | 248/313 |
| 7,029,069 B2 | * | 4/2006 | Hendren et al. | 297/256.12 |
| 2004/0016855 A1 | | 1/2004 | Berry et al. | |

* cited by examiner

*Primary Examiner*—Kimberly T Wood
(74) *Attorney, Agent, or Firm*—Foley & Lardner LLP (57) ABSTRACT

A system for removably restraining an object in a vehicle includes a housing for attachment to a structure of the vehicle and at least one holder coupled to the housing for movement between an access position and a restraint position. An extensible member has a first end operably engaging the holder and a second end coupled to a retractor device. The retractor device is coupled to the housing and locks the extensible member when the vehicle experiences an event involving a rapid change in position, speed or acceleration, so that the holder is movable to the access position during absence of the event and the holder is locked in the restraint position during the event.

6 Claims, 10 Drawing Sheets

FIGURE 10

AUTO-LOCKING HOLDER APPARATUS

BACKGROUND

The present invention relates to an auto-locking holder apparatus, and relates more specifically to an auto-locking holder for use in a vehicle for restraining objects such as self-contained breathing apparatus equipment.

It is generally known to provide holders for a storage of objects such as tanks (e.g. cylinders, containers, etc.) for self-contained breathing apparatus ("SCBA") in vehicles such as rescue vehicles, fire trucks and the like. SCBA holders can be integrated into an opening or recess in a seat back portion of a seat within the vehicle. Storage of the SCBA in the seat back is intended to permit a user occupying the seat to rapidly don the SCBA in response to an event. However, applicable regulations typically require SCBAs to be restrained in a manner that ensures that the SCBA remains secured during certain accident scenarios such as collisions, abrupt vehicle maneuvers, etc.

The known holders for SCBAs typically have a restraint that secures the SCBA until released by a user. For example, one type of holder secures a tank in an elongated cavity in a seat with belts. Another example of a holder provides a releasable clasping device and lanyard for use with a strap to secure a tank in a hollow seat back. However, the known SCBA holders tend to have certain disadvantages. For example, the known SCBA holders tend to require intervention by a user to release the SCBA from a restraining device when removing the SCBA from the holder.

Accordingly, it would be desirable to provide a holder for an object, such as an SCBA or the like, with an auto-lock feature that permits the object to be freely installed and removed from the holder by a user for use in a vehicle when the vehicle is not involved in an accident scenario, but that prevents the object from being released from the holder during applicable accident scenarios involving the vehicle. It would be further desirable to provide a holder integrated with a vehicle seat having an extendable/retractable member with a locking mechanism (e.g. an inertial lock, etc.—such as a type typically used with conventional seat belts for restraint of occupants in a vehicle) that the permits installation or removal of the object (e.g. SCBA, etc.) when the locking mechanism is unlocked (e.g. free, released, etc.) and that prevents removal of the object when the locking mechanism is locked. It would be further desirable to provide a holder configured to hold an object during events indicative of an accident scenario involving the vehicle and that permits the object to be removed without actuating separate retainers or retention devices (e.g. catches, latches, connectors, buckles, clasps, snaps, etc.) when the vehicle is not involved in an accident scenario. It would also be desirable to provide a holder configured to remain open for convenient placement of the object into the holder.

Therefore, it would be desirable to provide a holder apparatus for releasably holding an object having any one or more of these or other advantageous features.

SUMMARY

The present invention relates to an auto-locking holder apparatus for holding an object. The apparatus includes a holder frame and at least one holder member coupled to the frame for movement between a first position to permit removal of the object from the holder frame and a second position to prevent removal of the object from the holder frame. A retractor device is coupled to the frame and includes an extendable and retractable member operably engaging the holder member. A locking mechanism permits movement of the extendable and retractable member when the locking mechanism is unlocked so that the holder member is movable between the first position and the second position. The locking mechanism also prevents movement of the extendable and retractable member when the locking mechanism is locked so that the holder member is maintained in the second position.

The present invention also relates to a system for removably restraining an object in a vehicle. The system includes a housing attached to a structure of the vehicle and at least one holder member coupled to the housing for movement between an access position and a restraint position. An extensible member has a first end engaging the holder member and a second end coupled to a retractor device. The retractor device is coupled to the housing and locks the extensible member when the vehicle experiences an event involving a rapid change in position, speed or acceleration, so that the holder member is movable to the access position during absence of the event and the holder member is locked in the restraint position during the event.

The present invention further relates to an emergency response vehicle having an auto-locking holder for use with a self-contained breathing apparatus. The vehicle includes a seat frame coupled to the vehicle and a housing coupled to the seat frame. At least one holder is coupled to the housing and is movable between an open position permitting removal of the self-contained breathing apparatus and a closed position to retain the self-contained breathing apparatus. A locking mechanism coupled to the holder activates from an unlocked condition to a locked condition in response to an event to lock the holder in the closed position, so that the self-contained breathing apparatus is removable from the seat in a manner substantially free from release devices in the absence of the event and is restrained by the holder during the event.

The present invention further relates to an auto-locking apparatus for a vehicle for holding an object that permits removal of the object without separate release devices when the vehicle is not subject to an accident scenario and secures the object when the vehicle experiences an accident scenario. The apparatus includes a housing and at least one holder coupled to the housing for movement between an open position to permit removal of the object and a closed position to retain the object. A locking mechanism operably coupled to the holder activates from an unlocked condition to a locked condition in response to the accident scenario.

The present invention also relates to an auto-locking apparatus for holding an object that includes a housing and at least one holder coupled to the housing for movement between a first position for accessing the object and a second position for restraining the object. A drive system coupled between the housing and the holder permits movement of the holder during a first condition and prevents movement of the holder during a second condition. The drive system includes a flexible member configured in an over-center arrangement.

DETAILED DESCRIPTION

Referring to the FIGURES, an auto-locking holder apparatus for a vehicle is shown according to various embodiments for use in holding object(s) so that the object(s) may be freely removed or inserted into the holder during a first condition (e.g. a "normal" condition such as when the vehicle is stationary or traveling under normal or routine driving conditions or other transportation events that are not indicative of a potential accident scenario or the like) and the object(s) is restrained (e.g. "locked" or "secured" etc.) during a second condition (e.g. an "abnormal" condition such as when the vehicle is subject to or experiences an event indicative of a potential accident scenario such as abrupt or rapid changes in position, velocity or acceleration as may occur during emergency maneuvers, rapid stops, excessive braking, collisions, crashes, etc.). The term "acceleration" is understood to represent a change in speed or velocity of the vehicle (i.e. in either an increasing or decreasing manner). The auto-locking holder apparatus is shown and described for use in connection with a seat back of a vehicle, but may be used in any suitable location within a vehicle.

Referring to FIGS. 1-6, the auto-locking holder 10 is shown according to one embodiment. Auto-locking holder 10 is shown for use in combination with a vehicle seat frame 12 (a seat bottom cushion and a seat back cushion having a central opening for access to the holder have been omitted for clarity). Holder 10 may be attached to the seat back portion of frame 12 using a conventional method such as, but not limited to, brackets, fasteners, clips, welding, brazing, riveting, etc. According to one embodiment, the holder 10 is removably attached to the frame 12 so that the holder 10 is modular or portable and may be adapted for use with other structures within the vehicle. Holder 10 is adapted for holding an object 14 (shown as a tank, cylinder, etc. for an SCBA or the like). According to one embodiment, the object is an SCBA and may include any one or more of a tank (e.g. cylinder, bottle, etc.) for storage of air, valves, regulators, hoses, a breathing mask and a harness for attaching the SCBA to a user. SCBAs for use in connection with the holder apparatus include those that are commercially available from the Mine Safety Appliances Company of Pittsburgh, Pa. According to alternative embodiments, the object(s) may be any suitable object (e.g. fire extinguisher, medical equipment, etc.) intended to be quickly accessible during "normal" conditions, but restrained during "abnormal" conditions in the vehicle (e.g. to prevent the object from becoming a "projectile" within the vehicle, etc.).

Holder 10 is shown to include a generally rectangular holder frame 20 (e.g. base, housing, etc.) having side walls 22, a top wall 24 and a bottom wall 26 and a support member 28. The holder frame 20 is shown having a size and shape configured for use with the seat back portion of seat frame 12. The support member 28 is intended to improve structural stability of holder frame 20 and to provide a bearing surface for object 14 within the holder 10 (as shown schematically in FIG. 5). Holder 10 includes a pair of movable members (e.g. bars, rods, links, etc.—shown as shafts 30).

Figure 1:
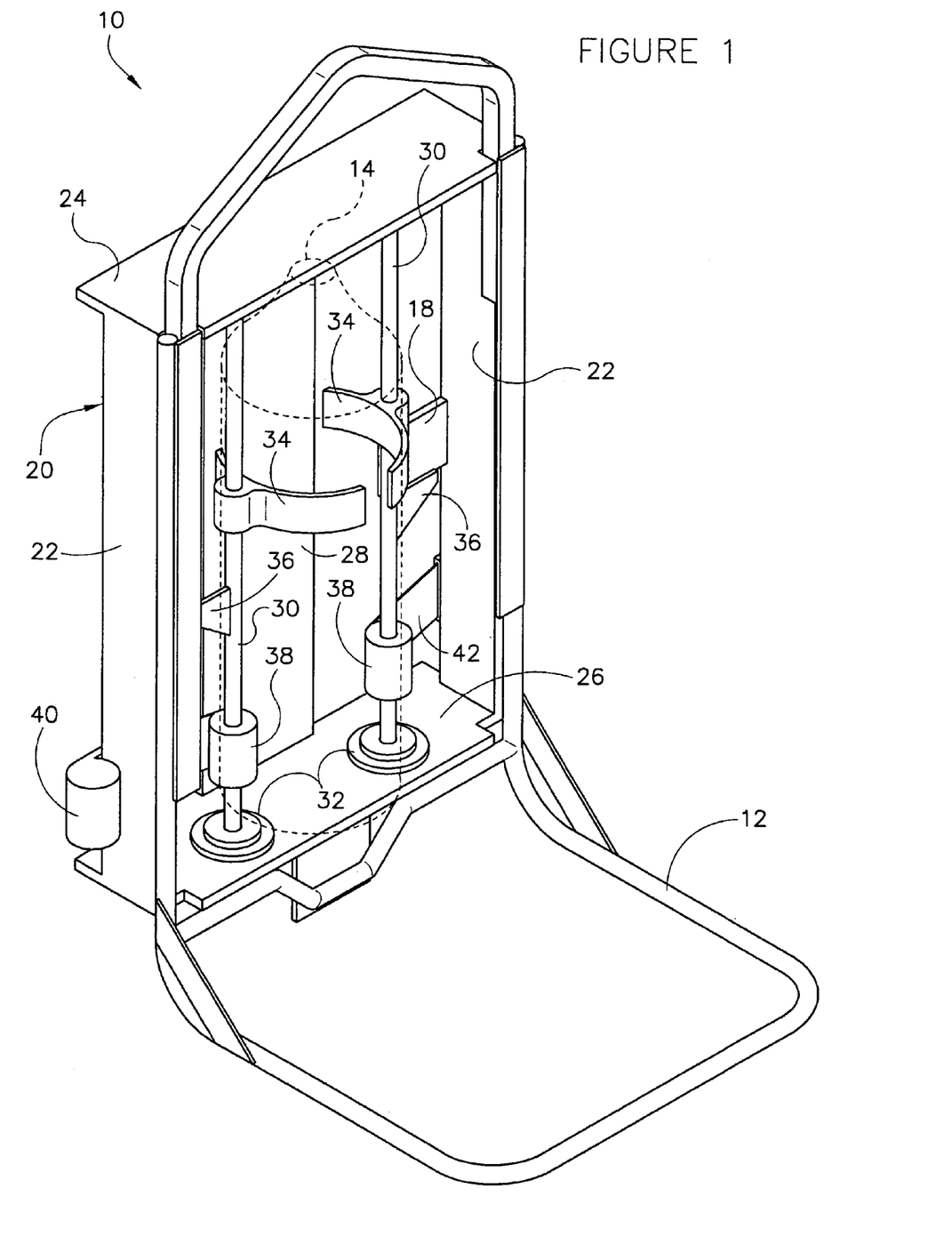
FIG. 1 is a schematic representation of a perspective view of a holder for an object and vehicle seat frame according to one embodiment.
Figure 2:
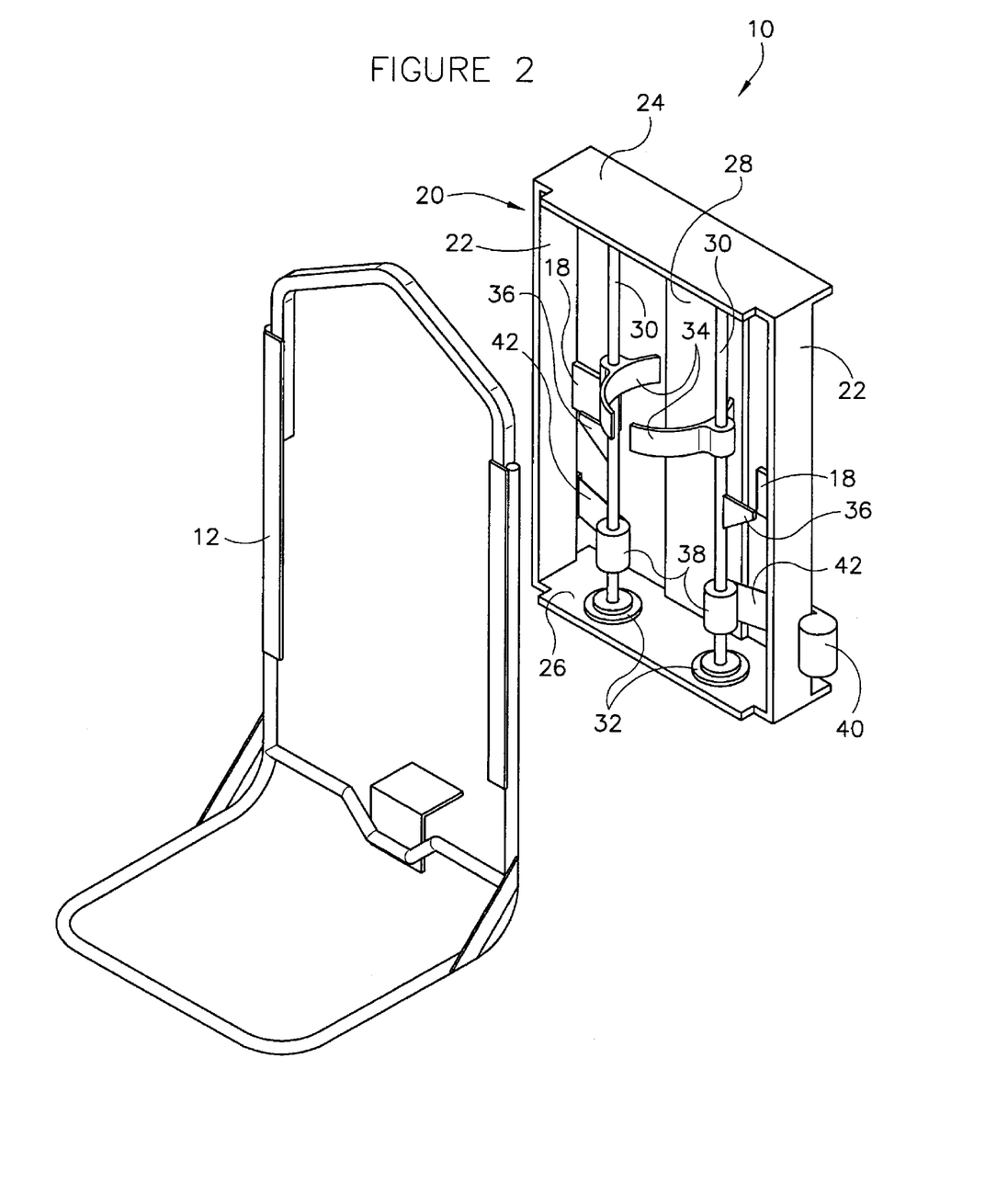
FIG. 2 is a schematic representation of a separated perspective view of the holder and vehicle seat frame according to the embodiment of FIG. 1.
Figure 3:
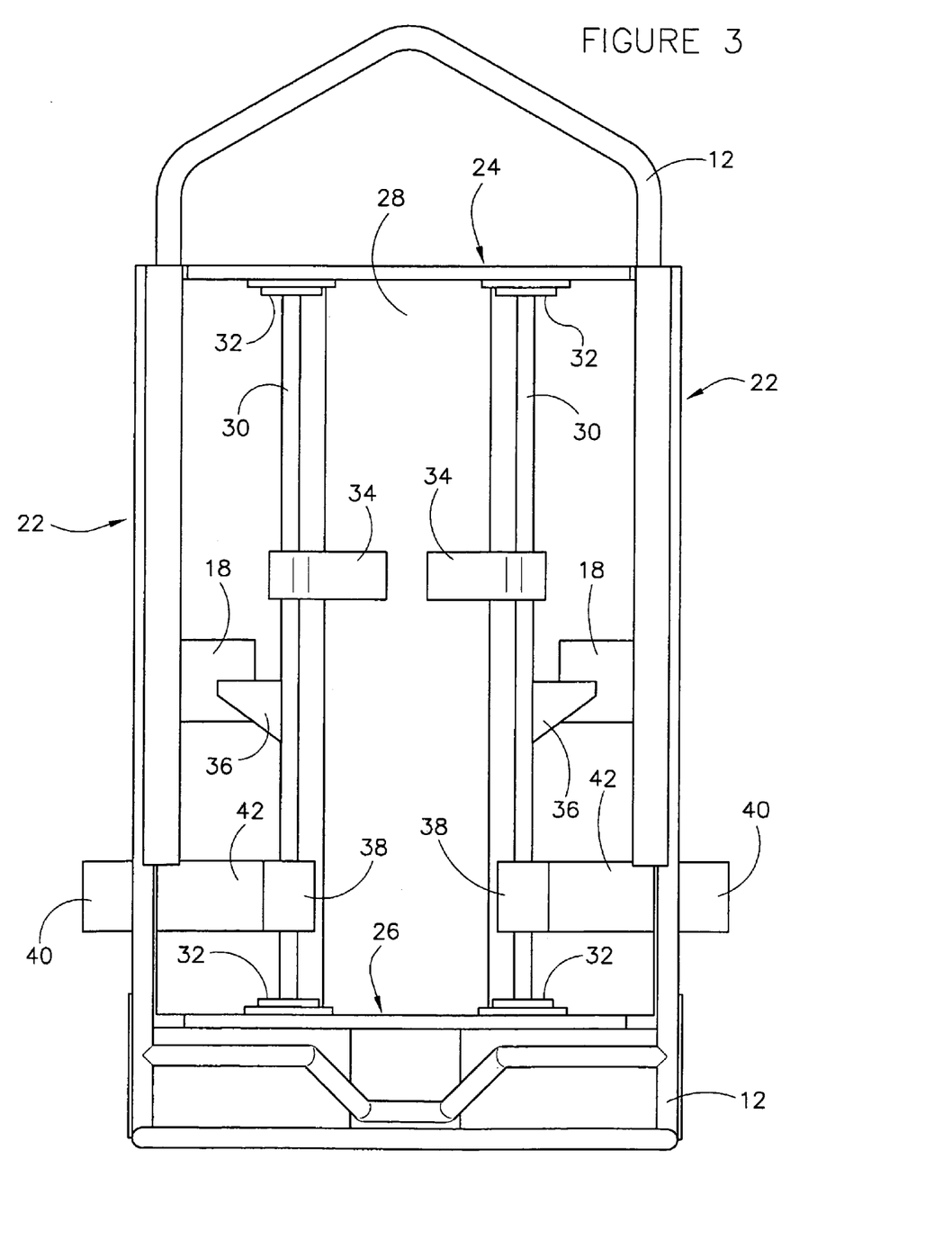
FIG. 3 is a schematic representation of a front elevation view of the holder and vehicle seat according to the embodiment of FIG. 1.
Figure 4:
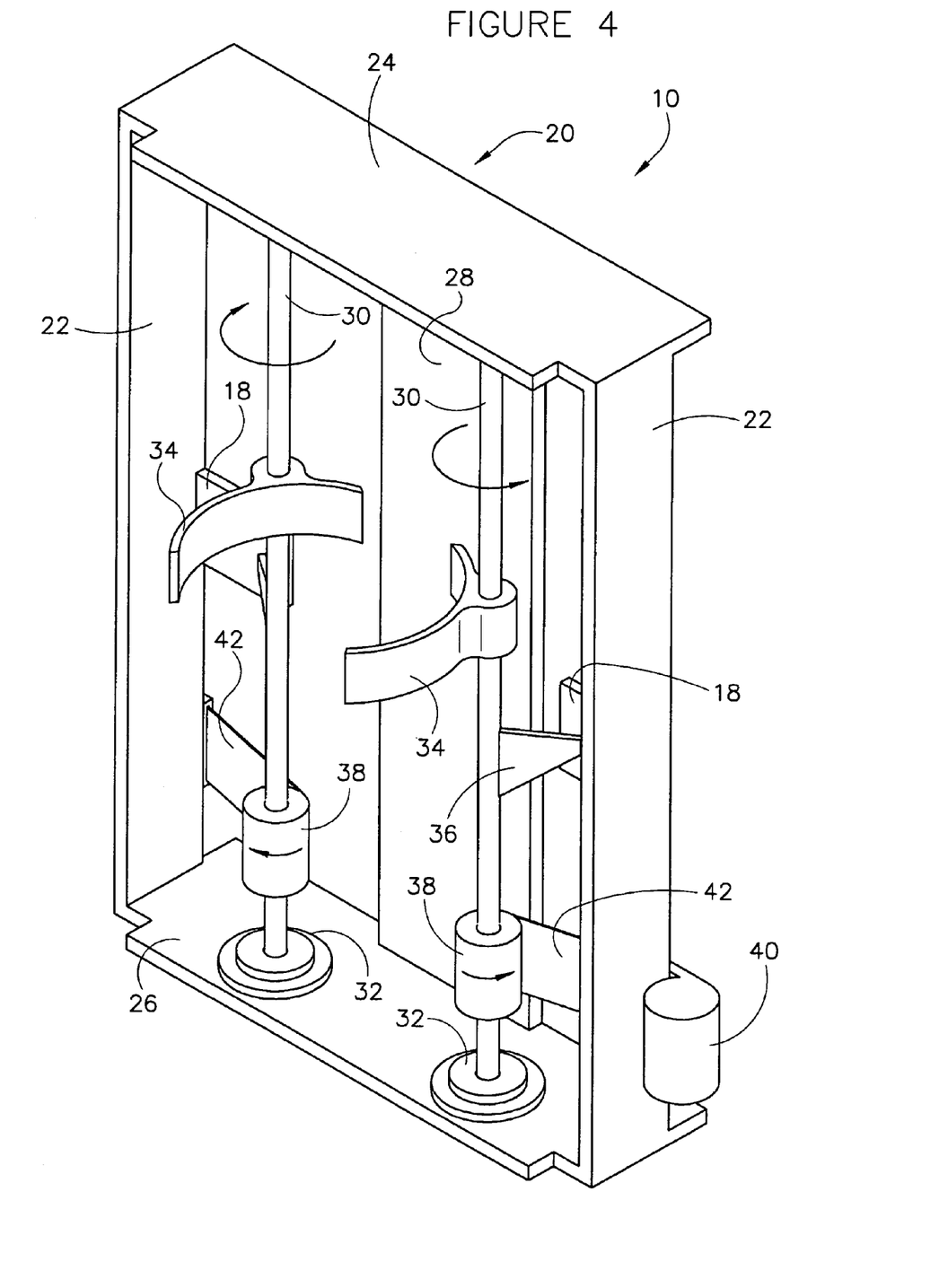
FIG. 4 is a schematic representation of a perspective view of the holder in an open position according to the embodiment of FIG. 1.
Figure 5:
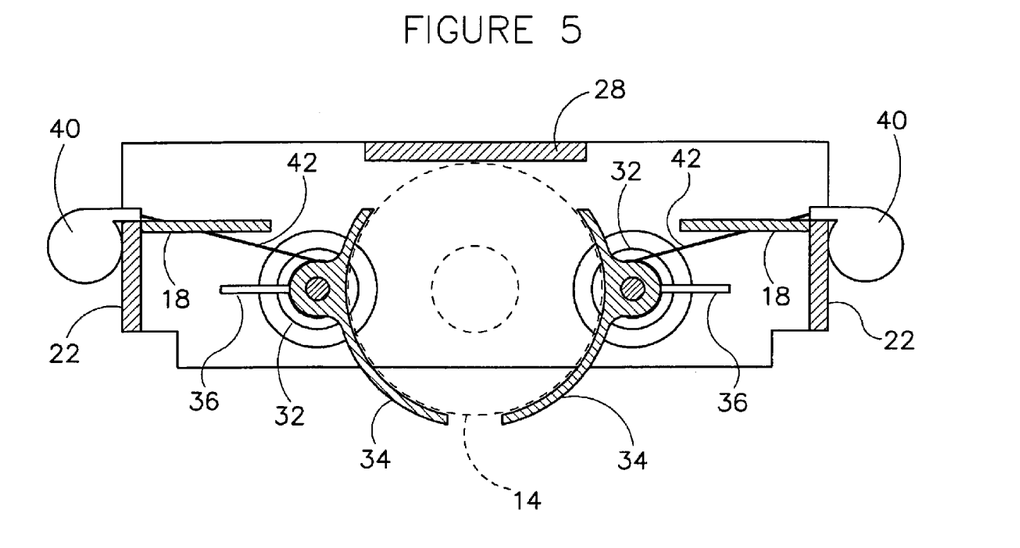
FIG. 5 is a schematic representation of a top sectional view of the holder in a closed position according to the embodiment of FIG. 1.
Figure 6:
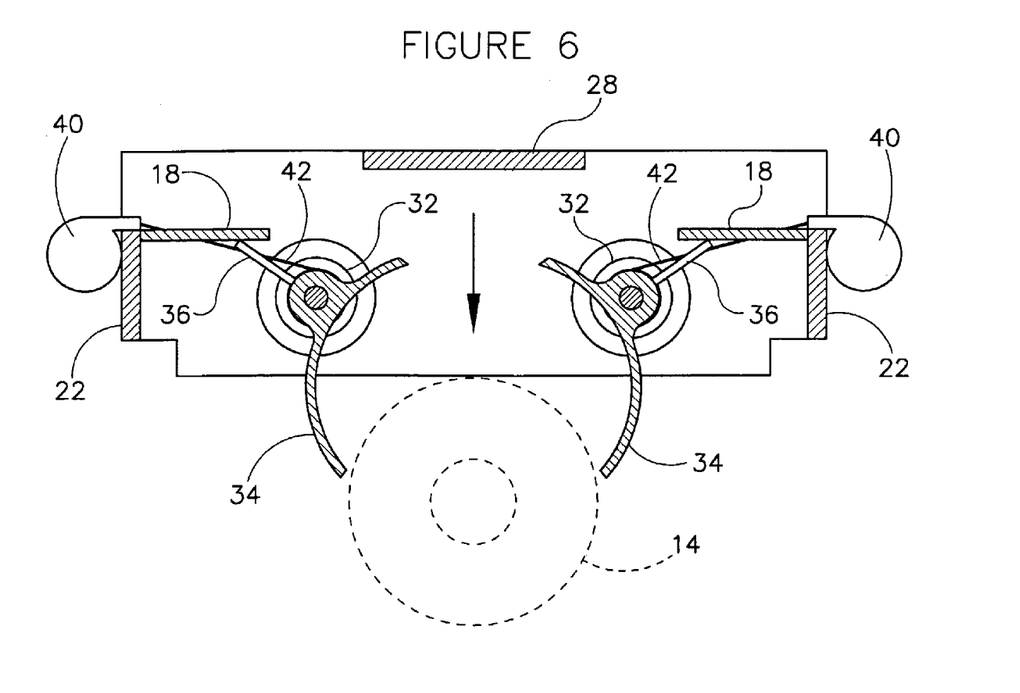
FIG. 6 is a schematic representation of a top sectional view of the holder in an open position according to the embodiment of FIG. 1.

Shafts 30 are shown as vertical members configured for rotation about a longitudinal axis of the shaft and rotatably or pivotally coupled to top wall 24 and bottom wall 26 by rotation devices 32 (e.g. bearings, bushings, etc.). Shafts 30 include a holder member 34 (e.g. clamp, jaw, restraint, barrier, etc.) shown as a generally arcuate bracket that is fixed to shaft 30 in a conventional manner (e.g. by a keyway, interference fit, fastener, etc.—not shown) so that the holder members rotate about the longitudinal axis of the shafts as the shafts rotate between a first position (e.g. opened, releasable, accessible, etc. as shown in FIGS. 4 and 6) and a second position (e.g. closed, restrained, secured, etc. as shown in FIGS. 1-3 and 5). Holder members 34 are shown having a shape intended to releasably engage object 14 by at least partially surrounding, enclosing, or barricading the object when the holders are in the second position, but that provides a sufficient opening or clearance to permit passage of the object between the holder members when the holder members are in the first position (as shown schematically in FIGS. 5 and 6).

A projection 36 (e.g. tab, arm, etc.) is shown attached to shaft 30 and is intended to contact a travel stop 18 attached to holder frame 20 when holder member 34 is moved to the first position (e.g. open position as shown schematically in FIG. 4). Shafts 30 are also shown to include a drive interface (e.g. drive member, etc.—shown for example as rollers 38) configured to interact with a "tension" device (i.e. configured to impart tension on the flexible member) shown as an auto-locking retractor device 40 having a locking mechanism and an extendable and retractable flexible member 42 (e.g. belt, strap, line, etc.).

Referring further to FIGS. 1-6, rollers 38 are shown to be generally cylindrical members concentrically mounted on shafts 30. According to alternative embodiments, the rollers may be mounted eccentrically to the shafts, or may have an oblong shape (e.g. egg-shaped, elliptical, etc.) and intended to provide a cam-like effect to vary the amount of force necessary to overcome the tension from the retractor device as the holder members move from the second position (e.g. closed) to the first position (e.g. open). For example, the rollers may be configured to require a greater initial force to begin movement of the holder members from the second position and then a decreasing force as the position of the holder members progresses to the first position.

Referring further to FIGS. 1-6, auto-locking retractor devices 40 are mounted to holder frame 20 (shown for example as coupled to an outside of side walls 22, but may be coupled to an inside of the side walls or other suitable portion of the holder frame). The extendable and retractable flexible member 42 is shown with a first end coupled to retractor device 40 and a second end coupled to rollers 38. According to one embodiment, retractor device 40 includes a spring-biased take-up reel (e.g. rotary, etc.) that is intended to provide tension on flexible member 42 so that shaft 30 and holder member 34 are biased toward the closed position. The amount of tension is intended to be sufficient to hold object 14 within the holder 10 during "normal" conditions and to permit a user to readily remove object 14 against the tension applied by retractor device 40. Retractor device 40 also includes an auto-locking mechanism (e.g. inertial lock, etc.—such as a ratchet-and-pawl type device, etc.) that prevents extraction of flexible member 42 from retractor device 40 during "abnormal" conditions to prevent holder members 34 from moving from the closed position to the open position, thereby restraining the object 14.

The auto-locking retractor device in combination with the flexible member, shaft and holder member is intended to permit convenient and rapid removal of the object from storage (such as, for example, during response to a fire or other emergency condition when a rapid response is desirable) and to secure or restrain the object within the holder (such as, for example, when traveling to or from the fire or emergency condition). When the holder is used in connection with a vehicle seat back for storage of an object such as an SCBA or the like, the holder permits a user (e.g. firefighter, emergency response personnel, etc.) to readily extract the object from the holder in response to an event, but restrains the object in the event that an "abnormal" condition is encountered during transport of the object by the vehicle (e.g. traveling to/from the location of the event, etc.).

Figure 7A:
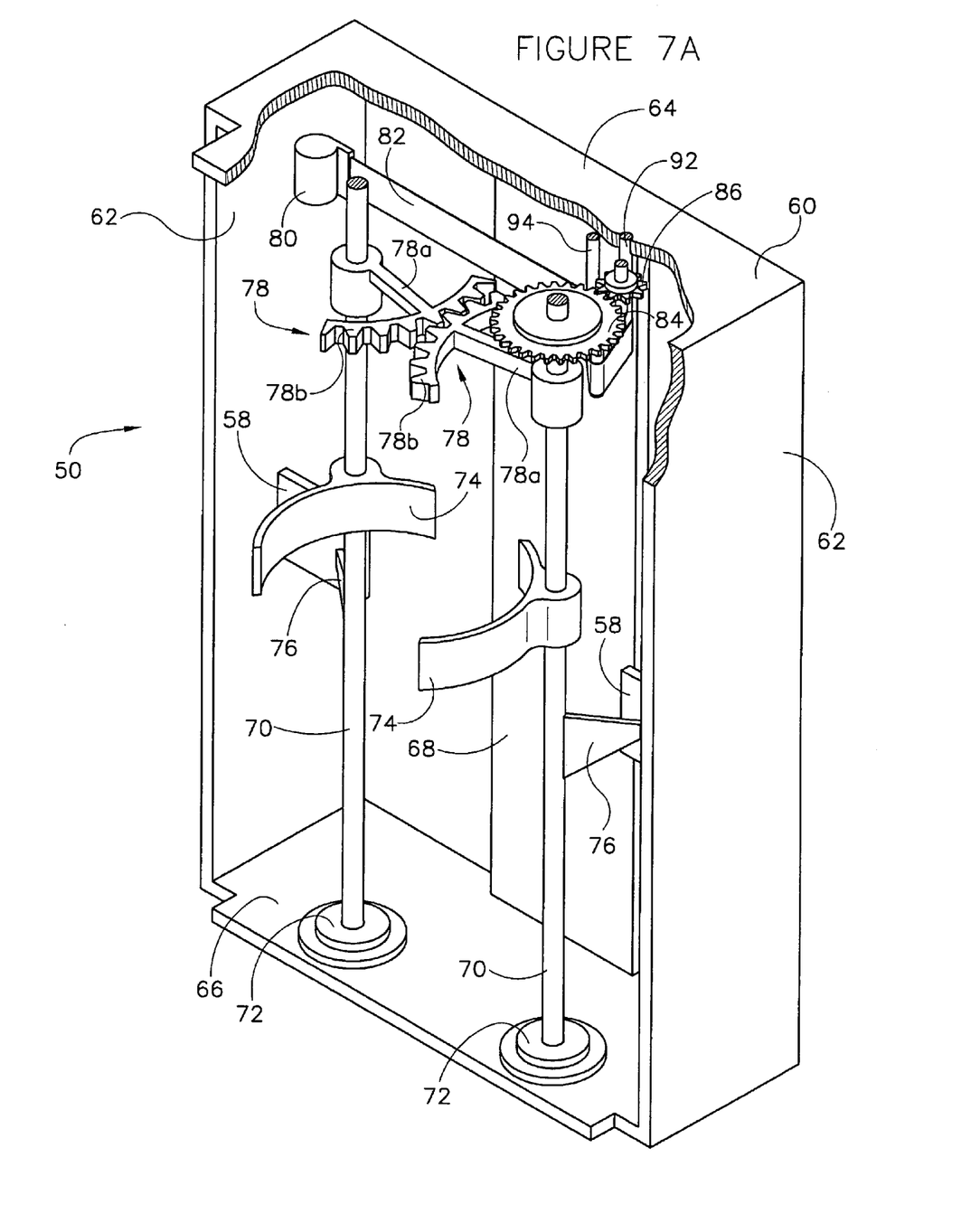
FIG. 7A is a schematic representation of a perspective view of a holder for an object according to another embodiment.
Figure 7B:
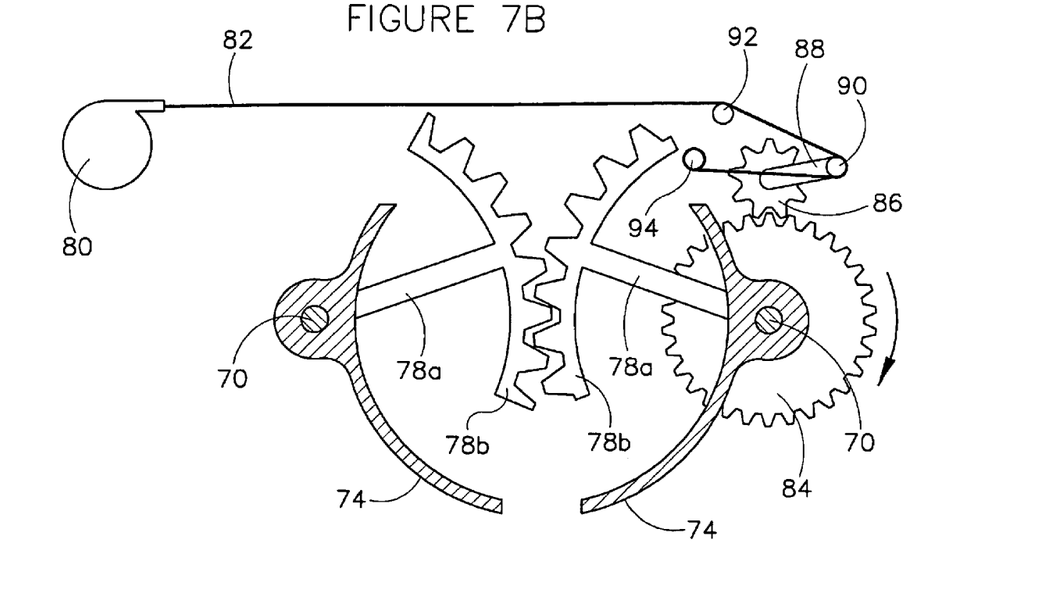
FIG. 7B is a schematic representation of a top sectional view of the holder in a closed position according to the embodiment of FIG. 7A.
Figure 7C:
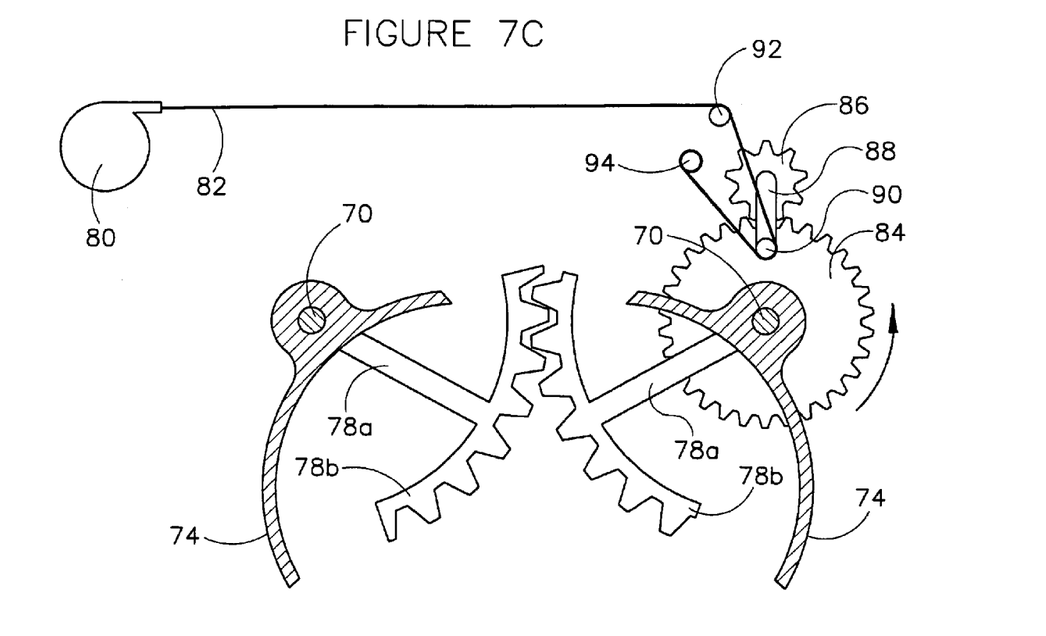
FIG. 7C is a schematic representation of a top sectional view of the holder in an open position according to the embodiment of FIG. 7A.

Referring to FIGS. 7A-7C, an auto-locking holder apparatus 50 is shown according to another embodiment (the seat frame has been omitted for clarity). Holder 50 is somewhat similar to holder 10 and includes a generally rectangular holder frame 60 having side walls 62, a top wall 64 and a bottom wall 66 and a support member 68 and a pair of movable members (shown as shafts 70). A projection 76 (e.g. tab, arm, etc.) is shown attached to shafts 70 and is intended to contact a travel stop 58 attached to holder frame 50 when holder member 74 is moved to the first position (e.g. open position as shown schematically in FIG. 7A).

Shafts 70 are shown as vertical members (similar to shafts 30) configured for rotation about a longitudinal axis of the shaft and rotatably or pivotally coupled to top wall 64 and bottom wall 66 by rotation devices 72 (e.g. bearings, bushings, etc.). Shafts 70 include a holder member 74 (e.g. clamp, jaw, restraint, barrier, etc.) shown as a generally arcuate bracket having a shape configured to correspond with the object (similar to holder members 34). The holder members are fixed to shafts 70 in a conventional manner so that the holder members rotate about the longitudinal axis of the shafts as the shafts rotate between a first position (e.g. opened, releasable, accessible, etc. as shown in FIG. 7C) and a second position (e.g. closed, restrained, secured, etc. as shown in FIG. 7B).

Holder 50 includes a drive system for moving the holder members. The drive system includes shafts 70 and a drive interface (e.g. drive member, etc.—shown for example as interacting gear members 78) that are fixed to shafts 70. Gear members are shown having an arm portion 78a and an interfacing portion 78b having intermeshing structure (e.g. teeth, ribs, projections, etc.). One shaft 70 is also shown to include a first gear 84 fixed to shaft 70 and/or gear member 78. A second gear 86 is provided to intermesh with first gear 84 so that each of gears 84 and 86 rotates about its central axis. Second gear 86 includes an arm 88 with a first end fixed to second gear 86 and arm 88 has a second end with a projection 90, so that arm 88 rotates with second gear 86. According to a preferred embodiment, first gear 84 and second gear 86 are provided with a gear ratio of approximately 3.5 to 1, and arm 88 has an effective length of approximately 1.5 inches from the center of second gear 86 to the center of projection 90, and the flexible member extends approximately 3 inches corresponding to an angle of rotation of the shafts of approximately 34 degrees from the closed position to the open position. However, other suitable gear ratios and dimensions may be used to provide a desired operation of the holder. Gear members 78, 84 and 86 are intended to provide a gear train between the holder members and a retractor device 80. Projections 92 and 94 are shown attached to frame 70 and extend at least partially along a common elevation with projection 90.

Referring further to FIGS. 7A-7C, holder 50 is also shown to include an auto-locking retractor device 80 having a locking mechanism and an extendable and retractable flexible member 82 (e.g. belt, strap, line, etc.). Auto-locking retractor device 80 is shown mounted to an inside of side wall 22 but may be mounted on any suitable portion of the holder frame. The extendable and retractable flexible member 82 is shown with a first end coupled to retractor device 80 and is then routed over projections 92 and 90 and has a second end coupled to projection 94. According to one embodiment, retractor device 80 includes a spring-biased take-up reel (e.g. rotary, etc.) that is intended to provide tension on flexible member 82 so that arm 88 is rotationally biased in a counter-clockwise direction and first gear 84 rotates in a clockwise direction so that shafts 70, gear members 78 and holder members 74 are biased toward the closed position (as shown schematically in FIG. 7B). The amount of tension is intended to be sufficient to hold an object within the holder 50 during "normal" conditions and to permit a user to readily remove the object against the tension applied by retractor device 80. The retractor device, flexible member, projections, gears and shafts are all intended to interact as a drive system to permit movement of the holder members to a first (e.g. open) position to access an object and to a second (e.g. closed) position to the secure or restrain an object. The auto-locking feature of the retractor device is configured to "lock" the drive system so that the holders are fixed and restrain an object when a vehicle is subject to an abnormal condition (as previously described).

Referring further to FIGS. 7B-7C, the drive system of holder 50 also includes an "over-center" type mechanism formed by projections 90, 92 and 94 and flexible member 82 that is configured to have an over-center point near the open position of the holder members (as shown in FIG. 7C). The tension applied by the retractor device 80 to the flexible member 82 tends to hold the holder members 74 open when the holder members have been moved beyond the over-center point to the open position and tends to move the holder members 74 to the closed position when the holder members are returned toward the closed position. A user may close the holder members after the object has been placed in the holder by overcoming the tension from the retractor device and moving the holder members beyond the over-center point toward the closed position. According to alternative embodiments, an over-center mechanism for biasing the holder members between an open position and a closed position may be provided with suitably located springs or the like.

Retractor device 80 (like retractor device 40) also includes an auto-locking mechanism (e.g. inertial lock, etc.—such as a ratchet-and-pawl type device, etc.) that prevents extraction of flexible member 82 from retractor device 80 during "abnormal" conditions to prevent holder members 74 from moving from the closed position to the open position, thereby restraining the object.

The auto-locking retractor device in combination with the flexible member, the gear members, the shafts and holder members is intended to permit convenient and rapid removal of an object from storage (such as, for example, during response to a fire or other emergency condition when a rapid response is desirable) and to secure or restrain the object within the holder (such as, for example, when traveling to or from the fire or emergency condition).

Figure 8:
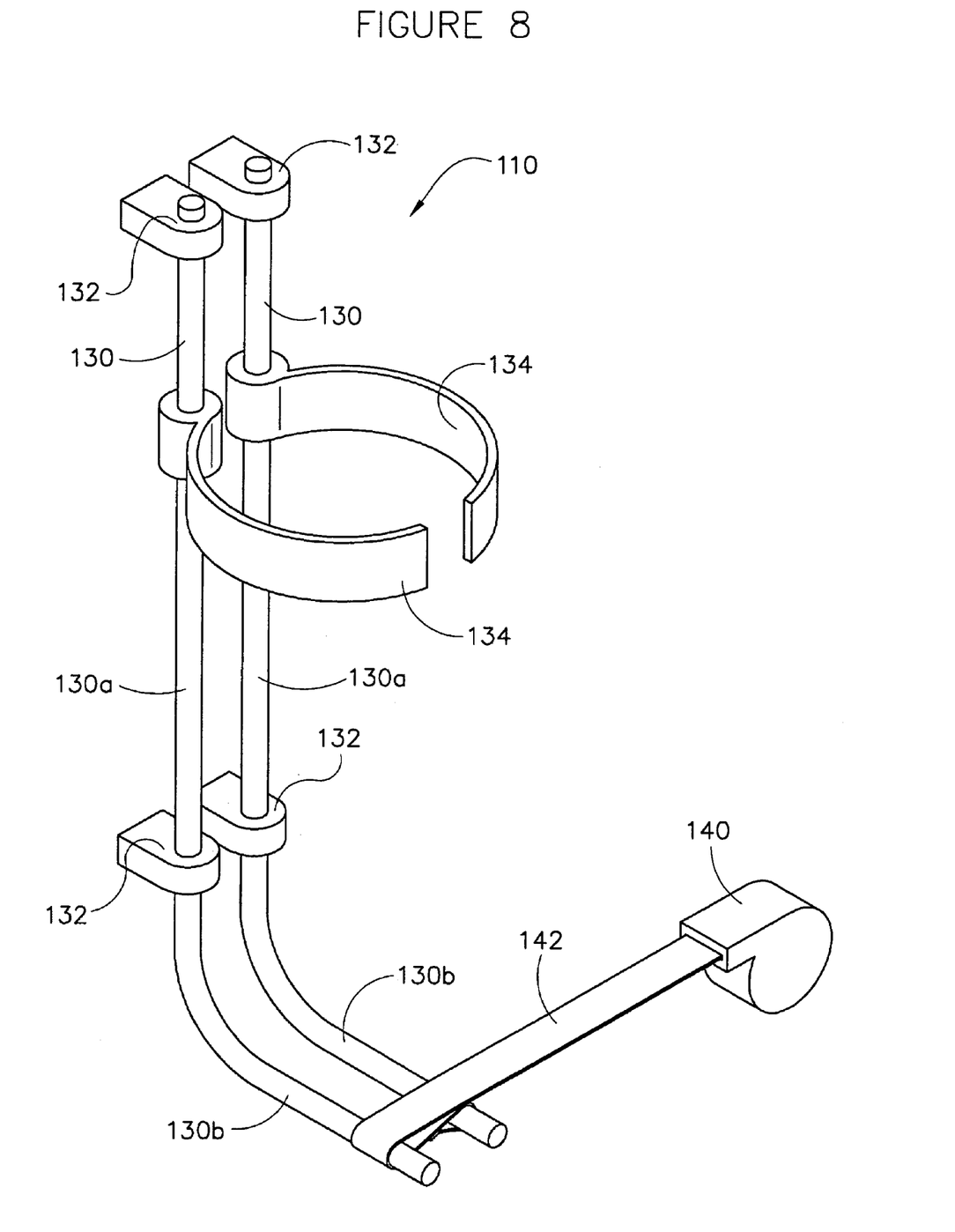
FIG. 8 is a schematic representation of a portion of a holder for an object according to yet another embodiment.

Referring to FIG. 8, an auto-locking holder apparatus 110 is shown according to another embodiment (the holder frame and seat frame have been omitted for clarity). Holder 110 is shown to include shafts 130 having a first longitudinal portion 130a extending between two rotational devices 132 and holder members 134 attached thereto for restraining the object(s) (not shown). A second lateral portion 130b (shown as a 130b lateral portion on the left and a 130b lateral portion on the right) of shafts 130 has an end engaging an extendable and retractable flexible member 142 of an auto-locking retractor device 140 configured to be mounted to the holder frame (not shown). Flexible member 142 is shown as "looped" over one lateral portion 130b and fixed to the other lateral portion 130b according to one embodiment. However, the flexible member may interface with the lateral portions in any suitable manner or configuration to move the holder members between an open and a closed position. During "normal" conditions, the holder members 134 are movable between the first and second positions by overcoming the tension applied by retractor device 140 and separating the second lateral portions 130b of the shafts 130. During "abnormal" conditions, the locking mechanism of the retractor device 140 prevents extraction of the flexible member 142 and prevents separation of lateral portions 130b of shafts 130 to maintain holder members 134 in the closed position.

According to alternative embodiments, more than one flexible member and retractor device may be used (e.g. one for each shaft, etc.). Further, the flexible member may engage only a single shaft or holder member and a suitable motion transfer device (e.g. gear, linkage, pulley, etc.) may interconnect the shafts or holder members for operation with a single flexible member and/or retractor device.

Figure 9:
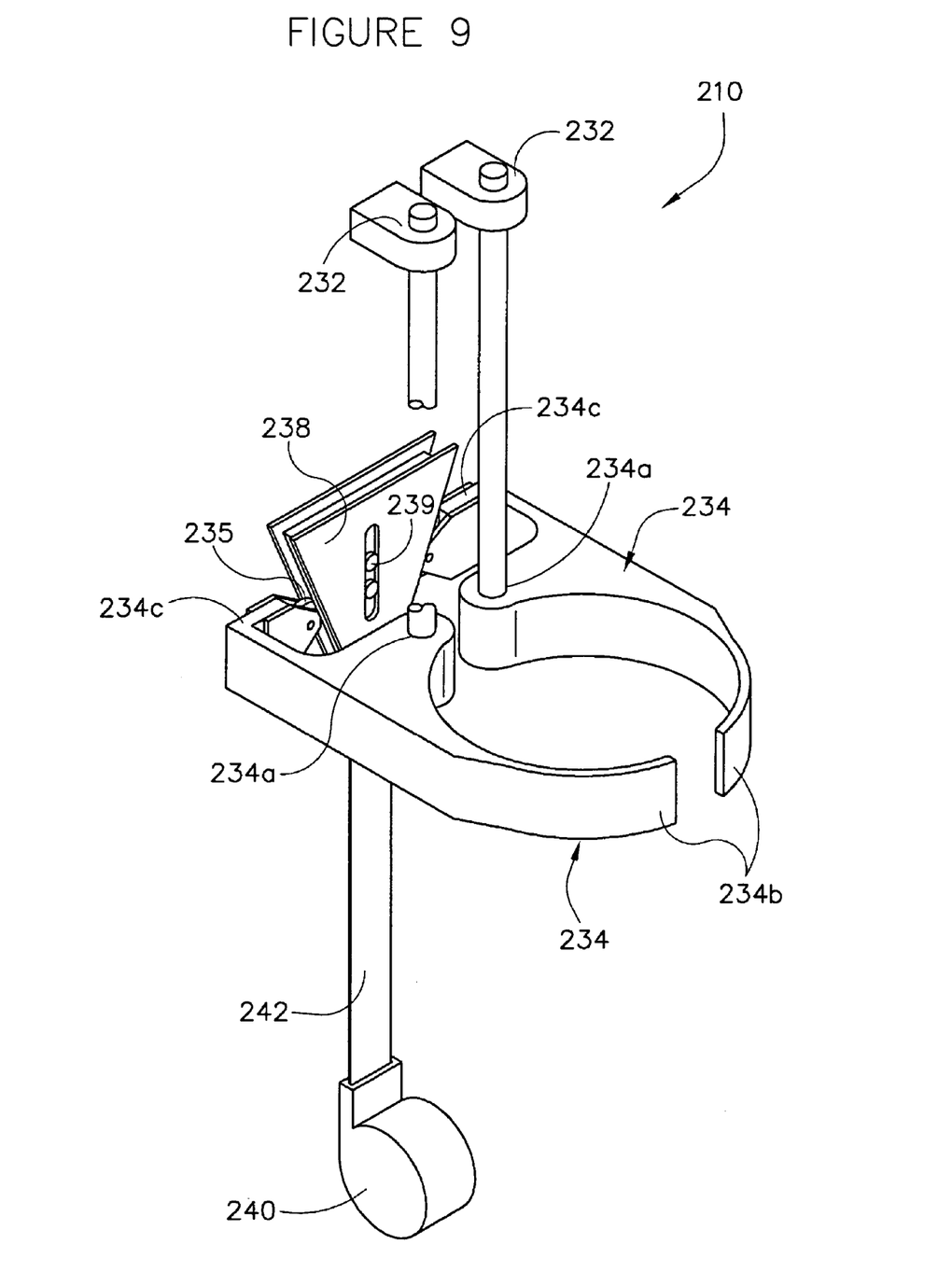
FIG. 9 is a schematic representation of a portion of a holder for an object according to an additional embodiment.

Referring to FIG. 9, an auto-locking holder apparatus 210 is shown according to another embodiment (the holder frame and seat frame have been omitted for clarity). Holder 210 is shown to include shafts 230 engaging a rotational device 232 (a second rotation device at an opposite end of the shafts has been omitted for clarity). Holder members 234 are pivotally coupled to shafts 230 at an intermediate point 234a. A first end 234b of holder members 234 is adapted to restrain the object(s) (not shown). A second end 234c of holder member 234 has a friction-reducing member (e.g. slide, roller, bearing, etc.) 235 configured to coact with a drive interface (e.g. cam, etc.—shown as a wedge member 238). Wedge member 238 is movably coupled to the holder frame (not shown) for movement in a vertically upward and downward manner by sliding over alignment members (shown as pins 239). An extendable and retractable flexible member 242 has one end coupled to wedge member 238. An opposite end of flexible member 242 is coupled to an auto-locking retractor device 240 configured to be mounted to the holder frame (not shown). During "normal" conditions, holder members 234 are movable from the second position to the first position by overcoming the tension applied by retractor device 240 and pivoting about pivot points 234a and moving the wedge member 238 in an upward direction. During "abnormal" conditions, the locking mechanism of retractor device 240 prevents extraction of the flexible member 242 and prevents upward movement of wedge member 238 in order to prevent opening of the first ends 234b of holder members 234 to maintain holder members 234 in the closed position.

According to alternative embodiments, any suitable pivot point may be used (with or without shafts) and the drive interface may have any suitable shape (e.g. arcuate, curvilinear, etc.). Further, the retractor device and flexible member may be located at any desirable location relative to the holder frame for controlling movement of the holder members.

Figure 10:
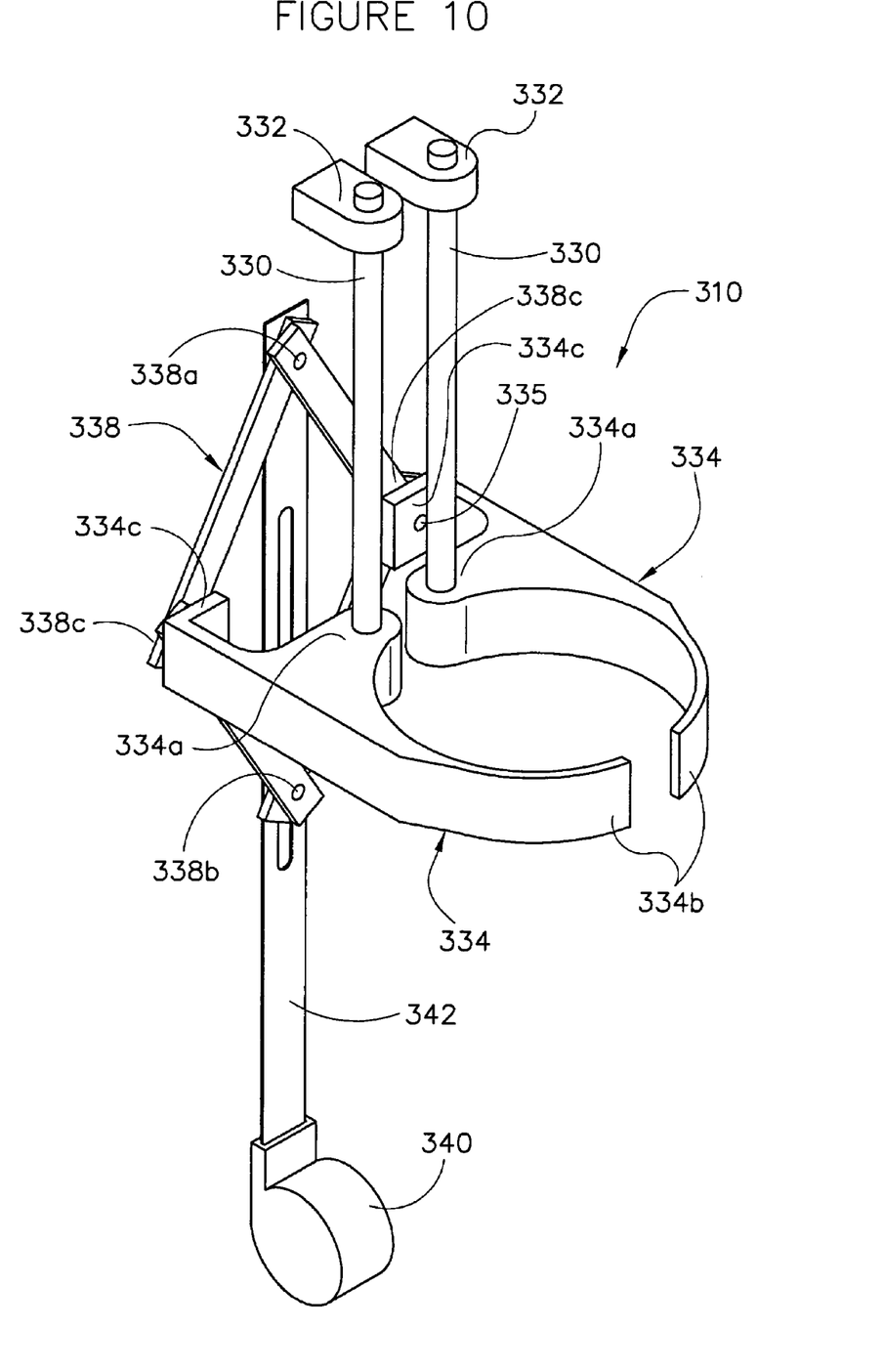
FIG. 10 is a schematic representation of a portion of a holder for an object according to a further embodiment.

Referring to FIG. 10, an auto-locking holder apparatus 310 is shown according to another embodiment (the holder frame and seat frame have been omitted for clarity). Holder 310 is shown to include shafts 330 engaging a rotational device 332 (a second rotation device at an opposite end of the shafts has been omitted for clarity). Holder members 334 are pivotally coupled to shafts 330 at an intermediate point 334a. A first end 334b of holder members 334 is adapted to restrain the object(s) (not shown). A second end 334c of holder member 334 has a connection point 335 (e.g. a pivot—such as, for example, a ball-and-socket joint, etc.) configured to coact with a drive interface (e.g. shown schematically as a four-bar linkage 338). Linkage 338 has a lower point 338a and an upper point 338b that are configured for relative expansion and contraction. As the upper and lower points 338a, 338b expand away from each other, the side points 338c of linkage 338 draw the connection points 335 of the second end 334c of the holder members 334 inwardly to open the first ends 334b of holder members 334 to the open position. As the upper and lower points 338a, 338b contract toward each other, the side points 338c of linkage 338 move the connection points 335 of the second end 334c of holder members 334 outwardly away from each other to move the first ends 334b of holder members 334 to the closed position. An extendable and retractable flexible member 342 has one end coupled to upper point 338a of linkage 338. An opposite end of flexible member 342 is coupled to an auto-locking retractor device 340 configured to be mounted to the holder frame (not shown). During "normal" conditions, holder members 334 are movable from the closed position to the open position by overcoming the tension applied by retractor device 340 and expanding upper point 338a and lower point 338b away from each other, thus pivoting second ends 334c of holder members 334 inwardly about pivot points 334a and opening the first ends 334b of holder members 334. During "abnormal" conditions, the locking mechanism of retractor device 340 prevents extraction of flexible member 342 and prevents upward movement of upper point 338a of linkage 338 in order to prevent opening of the first ends 334b of holder members 334 to maintain the holder members in the closed position.

According to alternative embodiments, any suitable linkage configuration and connection arrangement between the linkage and the holder members may be used. Also, the holder members may pivot about any suitable location and may use shafts or other suitable pivoting interface. Further, the retractor device and flexible member may be located at any desirable location relative to the holder frame for controlling movement of the holder members.

According to any preferred embodiment, the self-locking holder apparatus for an object is intended to provide holder members (e.g. clamps, arms, etc.) that are configured to engage the object and are movable between a first position (e.g. opened, releasable, accessible, etc.) during "normal" conditions where the object can be inserted or removed from the holder and a second position (e.g. closed, restrained, secured, etc.) during "abnormnal" conditions where the object is restrained within the holder. At least one extendable and retractable flexible member (e.g. belt, strap, line, etc.) interacts with the holder members. The flexible member is coupled to an auto-locking retractor device having a locking mechanism (e.g. inertial lock, etc.) that "locks" the flexible member from extending or retracting when the locking mechanism activates during "abnormal" conditions such as abrupt or rapid changes in position, velocity or acceleration of the apparatus (e.g. vehicle collisions, crashes, etc.). Activation of the locking mechanism prevents movement of the flexible member and the holder member to secure the object in the holder apparatus during the "abnormal" condition. When the locking mechanism is not activated, the holder members are readily movable to permit the object to be installed or removed in the holder.

It is also important to note that the construction and arrangement of the elements of the self-locking holder apparatus as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the operation of the interfaces between the brackets and the retractor devices may be reversed or otherwise varied, the length or width of the structures and/or members or connectors or other elements of the apparatus may be varied, the self-locking holder apparatus may be used in connection with any suitable structure of a vehicle and independent of a vehicle seat. By further way of example, a single flexible member and retractor device may be used in place of two flexible members and retractor devices to operate one or more holder members through suitably configured motion transfer devices (e.g. linkages, pivots, belts, pulleys, gears, etc.). Further, the flexible member and retractor device for use with the holder may be the vehicle seat belt system for an occupant of the seat and configured to interact with the holder, or may be provided separately for use solely with the holder apparatus. By further way of example, a single holder member may be provided and configured to cooperate with a stationary portion of the holder frame. It should be noted that the elements and/or assemblies of the self-locking holder apparatus may be constructed from any of a wide variety of materials that provide sufficient strength or durability, in any of a wide variety of colors, textures and combinations. It should also be noted that the self-locking holder apparatus may be used in association with other objects to be restrained and in connection with a wide variety of other types of vehicles such as automobiles, trucks, recreational vehicles, buses, ambulances, etc. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and, omissions may be made in the design, operating configuration and arrangement of the preferred and other exemplary embodiments without departing from the spirit of the present inventions as expressed in the appended claims.

What is claimed is:

1. An auto-locking holder apparatus for releasably holding a tank in a vehicle, comprising:
    a frame configured to support the tank;
    a first arm pivotally coupled to the frame for movement about a first axis;
    a second arm pivotally coupled to the frame for movement about a second axis, wherein the first axis and the second axis are substantially parallel to one another, and further wherein the first axis and the second axis are positioned to be substantially parallel to a longitudinal axis of the tank; and
    a locking mechanism comprising an inertial locking device that automatically changes position to lock the locking mechanism in response to a change in a velocity of the vehicle;
    wherein the first arm and second arm are moveable between:
        a closed position in which the first and second arms at least partially surround the tank; and
        an open position in which the first and second arms are positioned to permit removal of the tank;
    wherein the first arm and the second arm are freely moveable between the open and closed positions when the locking mechanism is unlocked such that the tank may be freely removed by moving the tank away from the first and second arms without actively placing the first arm and the second arm in the open positions; and
    wherein the locking mechanism, when locked, prevents the first arm and the second arm from moving from the closed position to the open position.

2. The apparatus of claim 1 wherein the locking mechanism further comprises a spring-biased reel.

3. The apparatus of claim 1 wherein the first and second arms are spring biased toward the closed position.

4. The apparatus of claim 1 wherein the frame is configured for attachment to a seat back within the vehicle.

5. The apparatus of claim 1 wherein the tank is part of a self-contained breathing apparatus.

6. The apparatus of claim 1, wherein, when the locking mechanism is unlocked, the tank may be freely removed by moving the tank away from the first and second arms in a direction substantially perpendicular to the first and second axes.

* * * * *